United States Patent [19]
Volpp

[11] 3,830,641
[45] Aug. 20, 1974

[54] 1,2,3-THIADIAZOL-5-YLCARBAMATE HERBICIDE COMPOSITIONS
[75] Inventor: Gert Paul Volpp, Princeton, N.J.
[73] Assignee: FMC Corporation, New York, N.Y.
[22] Filed: July 13, 1971
[21] Appl. No.: 162,264

[52] U.S. Cl............................. 71/90, 260/306.8 D
[51] Int. Cl................................................ A01n 9/12
[58] Field of Search ........................................ 71/90

[56] References Cited
UNITED STATES PATENTS
3,686,198   8/1972   Metzger et al.......................... 71/90

Primary Examiner—James O. Thomas, Jr.

[57] ABSTRACT

Novel herbicidal compositions containing lower alkyl and phenyl 1,2,3-thiadiazol-5-ylcarbamates as an essential active ingredient have selective pre-emergence and post-emergence activity. The synthesis of a preferred member of this class, methyl 1,2,3-thiadiazol-5-ylcarbamate, is described and its utility is exemplified.

1 Claim, No Drawings

1,2,3-THIADIAZOL-5-YLCARBAMATE HERBICIDE COMPOSITIONS

BACKGROUND OF THE INVENTION

1. Field of the Invention

This invention pertains to the general field of herbicides, and particularly to compositions which selectively control plant growth.

2. Description of the Prior Art

There is a substantial need for herbicides with selectivity in both pre- and post-emergence applications. It is known that certain substituted 1,2,4- and 1,3,4-thiadiazole derivatives exhibit herbicidal activity of varying types. However, the plant responses in selective pre-emergence and post-emergence herbicidal activity of the compounds of the present invention have not previously been reported or suggested in the art.

SUMMARY OF THE INVENTION

This invention pertains to novel herbicidal compounds, to new herbicidal compositions, and to new methods for the selective control of undesired plant growth in both pre-emergence and post-emergence treatment.

DETAILED DESCRIPTION OF THE INVENTION AND THE PREFERRED EMBODIMENT

The new herbicidal compositions of this invention have as the essential active ingredient compounds of the formula:

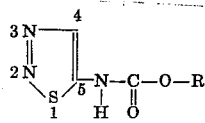

where R is lower alkyl of one to four carbon atoms or phenyl. These compounds, when formulated as an essential active ingredient of herbicidal compositions, and utilized in either pre-emergence or post-emergence application, have selective herbicidal properties.

The preparation of a preferred member of this class of compounds, methyl 1,2,3-thiadiazol-5-ylcarbamate, is illustrated below. Preparation of this compound has not been reported previously. All temperatures are expressed in degrees centigrade. All parts and percentages are by weight.

EXAMPLE 1 - SYNTHESIS

To a stirred suspension of 10.6 g of sodium thiocyanate in 20 ml of acetonitrile was slowly added 12.4 g of methyl chloroformate. The reaction mixture was stirred for 1½ hours, during which a pale yellow color developed. An equivalent amount of diazomethane (about 5.4 g) in ethyl ether was added and the reaction mixture was stirred at room temperature for 2 hours. The reaction mixture was extracted with three 100-ml volumes of 2N sodium hydroxide, and the alkaline extracts were combined and neutralized with hydrochloric acid to give solid product. The product was recrystallized from ethanol (using charcoal) to give 0.9 g of methyl 1,2,3-thiadiazol-5-ylcarbamate (mp = 202°–204°); a second recrystallization gave a melting point of 202°–203°. The ir and nmr spectra of the product were consistent with the assigned structure.

Analysis: Calc'd for $C_4H_5N_3O_2S$: C 30.19; H 3.17; N 26.41

Found: C 30.24; H 3.15; N 25.52.

An additional 3.1 g of material having identical melting point (202°–203°) was prepared using the same procedure.

For herbicidal applications, alkyl or phenyl 1,2,3-thiadiazol-5-ylcarbamates may be utilized in diverse formulations, including the adjuvants and carriers normally employed to facilitate the dispersion of active ingredients in agricultural applications, recognizing the fact that the formulation and mode of application of a toxicant may affect the activity of the material in a given application. Thus, the thiadiazolylcarbamates of this invention may be formulated as a granule of relatively large particle size, as a wettable powder, as an emulsifiable concentrate, as a solution, or as any of several other known types of formulations, depending on the desired mode of application.

Granular formulations are particularly useful for aerial distribution or for penetration of a canopy of foliage. Useful granular formulations may be of several types. Impregnated granules are those wherein the active ingredient is applied to large particles of an absorbent carrier, such as an attapulgite or kaolin clay, corncobs, expanded mica, etc., normally in the form of a solution in a solvent. Surface-coated granules may be produced by spraying the molten active ingredient onto the surface of a generally nonabsorbent particle or by spraying on a solution of active ingredient in a solvent. The core may be water-soluble such as a prilled fertilizer, or insoluble such as sand, marble chips, or coarse talc. Particularly useful is a granule wherein a wettable powder is applied as a surface coating to a sand or other insoluble particle such that the wettable powder may be dispersed on contact of the granule with moisture. Granules may be produced by agglomeration of dusts or powders by compaction rollers, by extrusion through a die, or by use of a granulating disc. Granular formulations may vary widely in concentration, with useful formulations containing as little as 0.5 percent or as much as 95 percent of active ingredient.

Wettable powders, also useful formulations for both pre- and post-emergence herbicides, are in the form of finely divided particles which disperse readily in water or other dispersants. The wettable powder is ultimately applied to the soil either as a dry dust or as an emulsion in water or other liquid. Typical carriers for wettable powders include fuller's earth, kaolin clays, silicas, and other highly absorbent, readily wet inorganic diluents. Wettable powders normally are prepared to contain about 5 to 80 percent of active ingredient, depending on the absorbency of the carrier, and usually also contain a small amount of a wetting, dispersing, or emulsifying agent to facilitate dispersion. For example, a useful wettable powder formulation contains 80.8 parts of the thiadiazolylcarbamates of this invention, 17.9 parts of palmetto clay, and 1.0 part of sodium lignosulfonate and 0.3 part of sulfonated aliphatic polyester as wetting agents.

Other useful formulations for herbicidal applications are the emulsifiable concentrates, which are homogeneous liquid or paste compositions dispersible in water or other dispersant, and may consist entirely of the thiadiazolylcarbamates of this invention with a liquid or solid emulsifying agent, or may also contain a liquid carrier, such as xylene, heavy aromatic naphthas, isophorone, and other nonvolatile organic solvents.

Typical wetting, dispersing, or emulsifying agents used in agricultural formulations include, for example, the alkyl and alkylaryl sulfonates and sulfates and their sodium salts; polyethylene oxides; sulfonated oils, fatty acid esters of polyhydric alcohols; and other types of surface-active agents, many of which are available in commerce. The surface-active agent, when used, normally comprises from 1 to 15 percent by weight of the herbicidal composition.

Other useful formulations for herbicidal applications include simple solutions of the active ingredient in a dispersant in which it is completely soluble at the desired concentration, such as acetone or other organic solvents. These formulations may be applied without further dilution or as dilute solutions, emulsions or suspensions in water or other suitable diluent. The compositions may be applied to the area wherein control is desired by spraying onto the undesired vegetation or onto the surface of the soil in the case of liquid compositions or by distribution from mechanical equipment in the case of solids. The surface-applied material may also be blended into the upper layer of soil by cultivation, or left as applied, as is appropriate to gain the optimum results with the particular treatment.

The selective pre-emergence and post-emergence herbicidal activity of methyl 1,2,3-thiadiazol-5-ylcarbamate is illustrated in the following example:

EXAMPLE 2 - SELECTIVE HERBICIDAL ACTIVITY

Pre-emergence herbicidal activity of methyl 1,2,3-thiadiazol-5-ylcarbamate was demonstrated as follows:

Test crop seeds were planted in 8 inches × 6 inches × 3 inches flat-bed trays containing two to three inches of sandy-loam soil. Within 24 hours after planting, the surface of the soil was sprayed with an aqueous-acetone (1:1) solution of the methyl 1,2,3-thiadiazol-5-ylcarbamate at a rate equivalent to 80 gallons/acre (12,000 ppm solution giving the 8 pound/acre rate). The trays were maintained in the greenhouse and watered regularly for 17 days after which time the phytotoxicity of the carbamate was assessed. Individual plant species were examined for percent kill in comparison with an untreated planting, and results are presented in Table 1.

Post-emergence herbicidal activity was demonstrated as follows: Test crop seeds were planted in 8 inches × 6 inches × 3 inches shallow flat-bed trays containing 2 to 3 inches of a loam soil. The growth trays were maintained in a greenhouse and watered regularly for approximately two weeks. When the first trifoliate leaves of bean plants were unfolding, the test plants were removed from the greenhouse and sprayed as the soil was in pre-emergence test above. The treated plants and untreated controls were maintained in the greenhouse and watered regularly for an additional seventeen days after which time the phytotoxicity of the carbamate was assessed. Individual plant species were examined for percent kill, and results are presented in Table 1.

Table 1

Selective Herbicidal Activity of Methyl 1,2,3-thiadiazol-5-ylcarbamate

| Test Plant Species | Percent Kill at 8 lb/A | |
|---|---|---|
| | Pre-emergence | Post-emergence |
| Lima Beans | 0 | 0 |
| Corn | 0 | 0 |
| Lettuce | 0 | 100 |
| Mustard | 0 | 100 |
| Crabgrass | 80 | 0 |

The selectivity of this novel herbicide is evident in these results.

EXAMPLE 3 - SELECTIVE HERBICIDAL ACTIVITY

Pre-emergence and post-emergence herbicidal activity of phenyl 1,2,3-thiadiazol-5-ylcarbamate was demonstrated following the procedures employed in Example 2, utilizing 1,500 ppm solution of carbamate to provide the 1 pound/acre rate. Results are presented in Table 2.

Table 2

Selective Herbicidal Activity of Phenyl 1,2,3-thiadiazol-5-ylcarbamate

| Test Plant Species | Percent Kill | | | | | |
|---|---|---|---|---|---|---|
| | Pre-emergence | | | Post-emergence | | |
| | 1 lb/A | 2 lb/A | 4 lb/A | 1 lb/A | 2 lb/A | 4 lb/A |
| Lima Beans | 0 | 0 | 0 | 0 | 0 | 0 |
| Corn | 0 | 0 | 0 | 0 | 0 | 0 |
| Lettuce | 0 | 70 | 100 | 30 | 70 | 100 |
| Mustard | 20 | 70 | 100 | 0 | 40 | 90 |
| Crabgrass | 0 | 0 | 0 | 0 | 0 | 0 |

Once again the selectivity of this herbicidal compound is evident.

The active herbicidal compounds of this invention may be formulated and/or applied with insecticides, fungicides, nematicides, plant-growth regulators, fertilizers, and other agricultural chemicals. In applying the active compounds of this invention, whether formulated alone or with other agricultural chemicals, an effective amount and concentration of thiadiazolylcarbamate are of course employed.

It is apparent that various modifications may be made in the formulation and application of the novel compounds of this invention, without departing from the inventive concept herein, as defined in the following claims.

I claim:

1. Method of controlling undesired plant growth which comprises applying a herbicidal amount of methyl 1,2,3-thiadiazol-5-ylcarbamate in admixture with an agricultural carrier to the locus where control is desired.

* * * * *